(12) United States Patent
Doyle et al.

(10) Patent No.: US 8,727,593 B2
(45) Date of Patent: May 20, 2014

(54) DISPLAYS WITH ROUNDED-TIP TURNING FILMS

(75) Inventors: David A. Doyle, San Francisco, CA (US); Joshua G. Wurzel, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 13/523,731

(22) Filed: Jun. 14, 2012

(65) Prior Publication Data

US 2013/0335999 A1  Dec. 19, 2013

(51) Int. Cl.
*F21V 8/00* (2006.01)
*G09F 13/04* (2006.01)

(52) U.S. Cl.
USPC .......................................... 362/607; 362/606

(58) Field of Classification Search
USPC ............... 313/498–512; 445/24–25; 362/607, 362/294, 500
See application file for complete search history.

(56) References Cited

U.S. PATENT DOCUMENTS

| | | | |
|---|---|---|---|
| 6,280,063 B1 * | 8/2001 | Fong et al. | 362/333 |
| 6,356,389 B1 | 3/2002 | Nilsen et al. | |
| 7,251,079 B2 | 7/2007 | Capaldo et al. | |
| 7,503,684 B2 | 3/2009 | Ueno et al. | |
| 7,943,206 B2 | 5/2011 | Jones et al. | |
| 8,360,619 B2 * | 1/2013 | Weng et al. | 362/311.06 |
| 2004/0169791 A1 | 9/2004 | Nilsen et al. | |
| 2007/0092699 A1 | 4/2007 | Luong et al. | |
| 2007/0121227 A1 | 5/2007 | Wang et al. | |
| 2009/0122577 A1 * | 5/2009 | Wu et al. | 362/627 |
| 2010/0033827 A1 | 2/2010 | Foley et al. | |
| 2011/0058257 A1 * | 3/2011 | Lin et al. | 359/599 |

FOREIGN PATENT DOCUMENTS

EP  980533  3/2002

* cited by examiner

*Primary Examiner* — Tracie Y Green
(74) *Attorney, Agent, or Firm* — Treyz Law Group; G. Victor Treyz; Kendall P. Woodruff

(57) ABSTRACT

An electronic device may be provided with a display having backlight structures. The backlight structures may include a light source. Light from the light source may be coupled into an edge of a light guide plate. The backlight structures may include layers such as a diffuser layer and one or more layers of brightness enhancing film. The brightness enhancing film layers may be used to collimate light scattered from the light guide plate and thereby enhance backlight efficiency. Brightness enhancing films may be formed from transparent substrates such as layers of polyester. A patterned polymer layer such as a layer of patterned cured resin may be formed on the transparent substrate of a backlight enhancing film. A roller-based manufacturing process may be used to form the patterned polymer layer on the substrate. The patterned polymer layer may include a series of parallel ridges with rounded peaks.

15 Claims, 6 Drawing Sheets

DISPLAYS WITH ROUNDED-TIP TURNING FILMS

BACKGROUND

This relates to electronic devices and, more particularly, to electronic devices with displays.

Electronic devices such as cellular telephones and computers are often provided with displays. To ensure that displays are visible in a wide variety of lighting conditions, displays are often provided with backlight units. A light source such as an array of light-emitting diodes may provide a backlight unit with light. A transparent light guide plate may be used to laterally distribute light from the light-emitting diodes over the display.

To enhance backlight efficiency and thereby ensure that a display exhibits satisfactory backlight brightness levels, brightness enhancing films are often incorporated into a display backlight unit. These films, which are sometimes referred to as prism films or turning films, help direct light escaping from the light guide plate upwards through display layers towards a user.

If care is not taken, the layers in a display such as prism or turning film layers may be susceptible to damage. For example, conventional prism or turning film surface features may be crushed during an impact event, leading to undesirable dark and white spots on a display.

It would therefore be desirable to be able to provide improved display backlight structures.

SUMMARY

An electronic device may be provided with a display having backlight structures. The backlight structures may include a light source. Light from the light source may be coupled into an edge of a light guide plate.

The backlight structures may include layers such as a diffuser layer and one or more layers of brightness enhancing film. The diffuser layer and brightness enhancing film structures may overlap the light guide plate. During use of a device, the brightness enhancing film layers may be used to collimate light scattered from the light guide plate and thereby enhance backlight efficiency.

Brightness enhancing films may be formed from transparent substrates such as layers of polyester. A patterned polymer layer such as a layer of patterned cured resin may be formed on the transparent substrate of a backlight enhancing film. A roller-based manufacturing process may be used to form the patterned polymer layer on the substrate. The patterned polymer layer may include a series of parallel ridges with rounded peaks. The ridges may have a triangular cross-sectional shape.

Further features of the invention, its nature and various advantages will be more apparent from the accompanying drawings and the following detailed description of the preferred embodiments.

DETAILED DESCRIPTION

An electronic device display may include a backlight structure with one or more brightness enhancing films (sometimes referred to as turning films). The brightness enhancing films may have a series of parallel ridges to help collimate backlight for the display. The ridges may have triangular cross-sections with tips that are rounded to enhance mechanical robustness.

Figure 1:
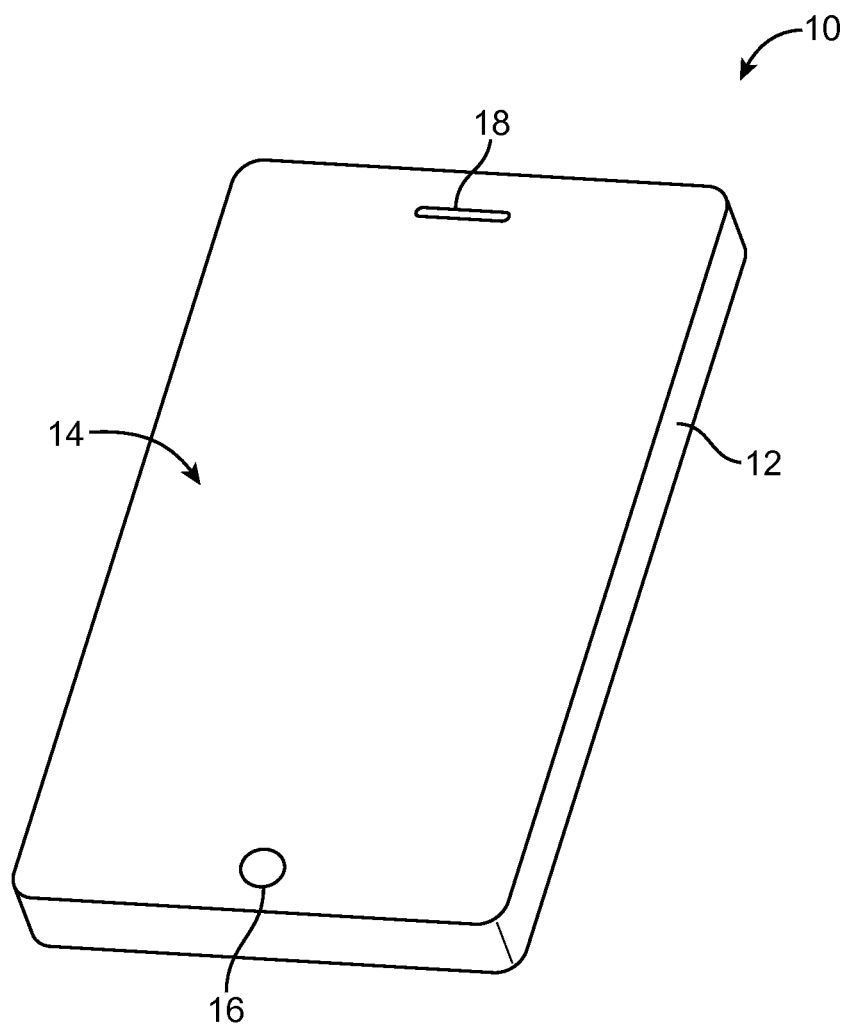
FIG. 1 is a front perspective view of an illustrative electronic device of the type that may be provided with brightness enhancing films in accordance with an embodiment of the present invention.

FIG. 1 is a diagram of an electronic device of the type that may be provided with a display having robust brightness enhancing films. Device 10 may be a handheld device such as a cellular telephone or media player, a tablet computer, a notebook computer, other portable computing equipment, a wearable or miniature device such as a wristwatch or pendant device, a television, a computer monitor, or other electronic equipment.

As shown in FIG. 1, electronic device 10 may include a display such as display 14. Display 14 may be a touch screen that incorporates a layer of conductive capacitive touch sensor electrodes or other touch sensor components or may be a display that is not touch-sensitive. Display 14 may include an array of display pixels formed from liquid crystal display (LCD) components, an array of electrophoretic display pixels, an array of electrowetting display pixels, or display pixels based on other display technologies. Configurations in which display 14 includes display layers that form liquid crystal display (LCD) pixels may sometimes be described herein as an example. This is, however, merely illustrative. Display 14 may include display pixels formed using any suitable type of display technology.

Display 14 may be protected using a display cover layer such as a layer of transparent glass or clear plastic. Openings may be formed in the display cover layer. For example, an opening may be formed in the display cover layer to accommodate a button such as button 16 and an opening such as opening 18 may be used to form a speaker port. Device configurations without openings in display 14 may also be used for device 10.

Device 10 may have a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

Figure 2:
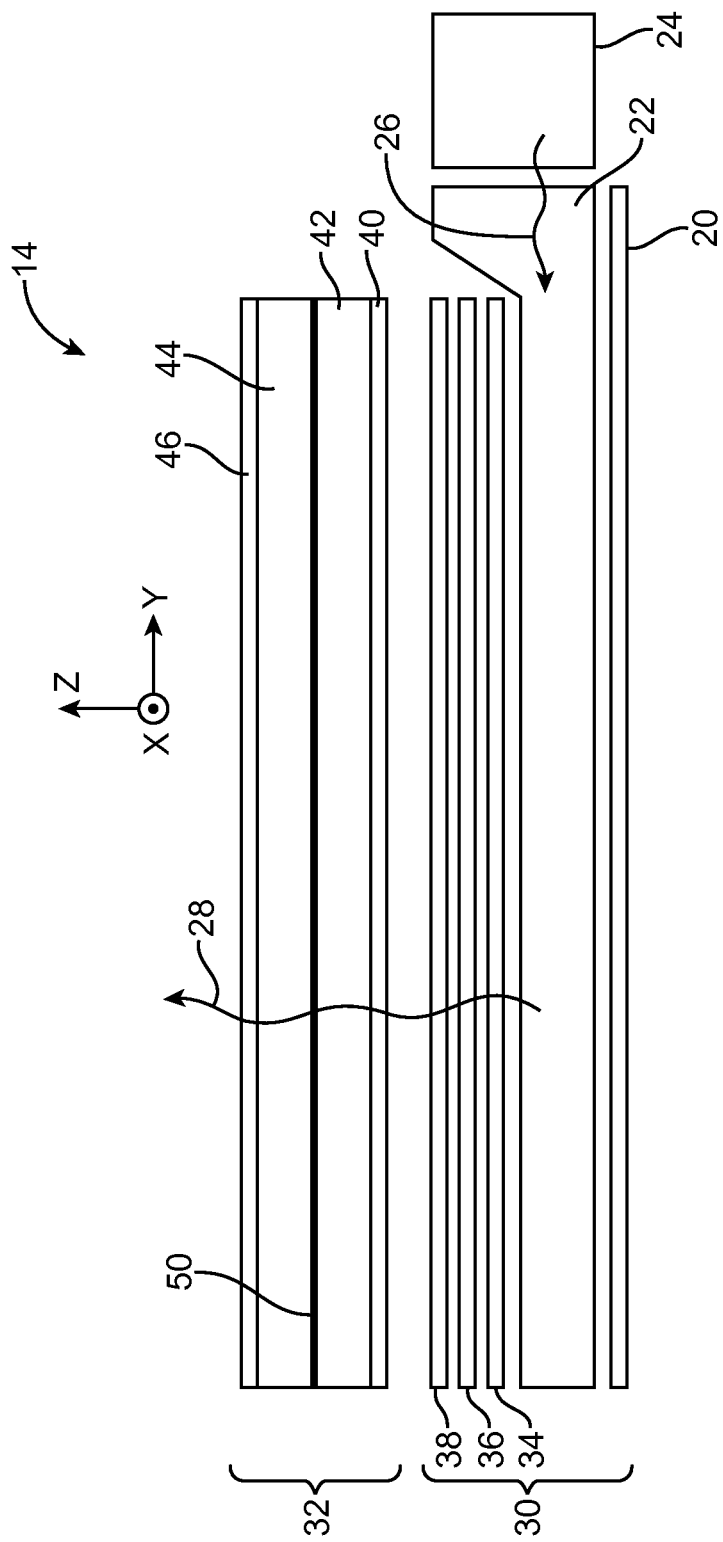
FIG. 2 is a cross-sectional side view of a display with backlight structures in accordance with an embodiment of the present invention.

A cross-sectional side view of display 14 is shown in FIG. 2. As shown in the illustrative configuration for display 14 of FIG. 2, display 14 may include a display module such as display module 32 and an associated backlight unit such as backlight unit 30. Backlight unit 30 may provide backlight 28 that travels vertically upwards through the layers of display module 32 in direction Z.

Display module 32 may be a liquid crystal display module or display structures formed using other display technologies. In the example of FIG. 2, display module 32 has been implemented using liquid crystal display technology. As shown in FIG. 2, display module 32 in this type of configuration may include a layer of liquid crystal material such as liquid crystal layer 50 sandwiched between display layers 44 and 42. Display layer 42 may be a thin-film transistor layer having a transparent substrate such as a layer of glass. Thin-film transistors and electrodes on layer 42 may be used in applying electric fields to liquid crystal layer 50 to present images to a user. Display layer 42 may be a color filter layer having an array of color filter elements on a transparent glass or plastic substrate for providing display 14 with the ability to display color images. Display layers 44 and 40 may be interposed between polarizer layers such as lower polarizer 40 and upper polarizer 46.

Backlight unit 30 may have a light source such as light source 24 that produces light 26. Light source 24 may include an array of light-emitting diodes or other light emitting devices. Light 26 from light source 24 may be coupled into an adjacent edge of light guide plate 22. Light guide plate 22 may be formed from a transparent sheet of material such as a clear plastic layer. During operation, light 26 may be distributed laterally (in dimensions X and Y of FIG. 2) due to the principal of total internal reflection. Reflector 20 may be used to reflect light that has scattered downwards back in upwards direction Z, thereby enhancing backlight efficiency.

Some of the light that is traveling in light guide plate 22 may escape through the upper surface of light guide plate to form backlight 28. Backlight unit 30 may include backlight films such as layers 34, 36, and 38 for enhancing the quality of backlight 28. With one suitable arrangement, layer 34 may be a diffusing layer for minimizing hotspots and layers 36 and 38 may be brightness enhancing films for collimating backlight 28. Additional layers (e.g., another diffuser layer, etc.) may be incorporated into backlight unit 30 if desired. The configuration of FIG. 2 in which a single diffuser such as diffuser layer 34 and two brightness enhancing films such as layers 36 and 38 are used in backlight structures 30 is merely illustrative.

Figure 3:
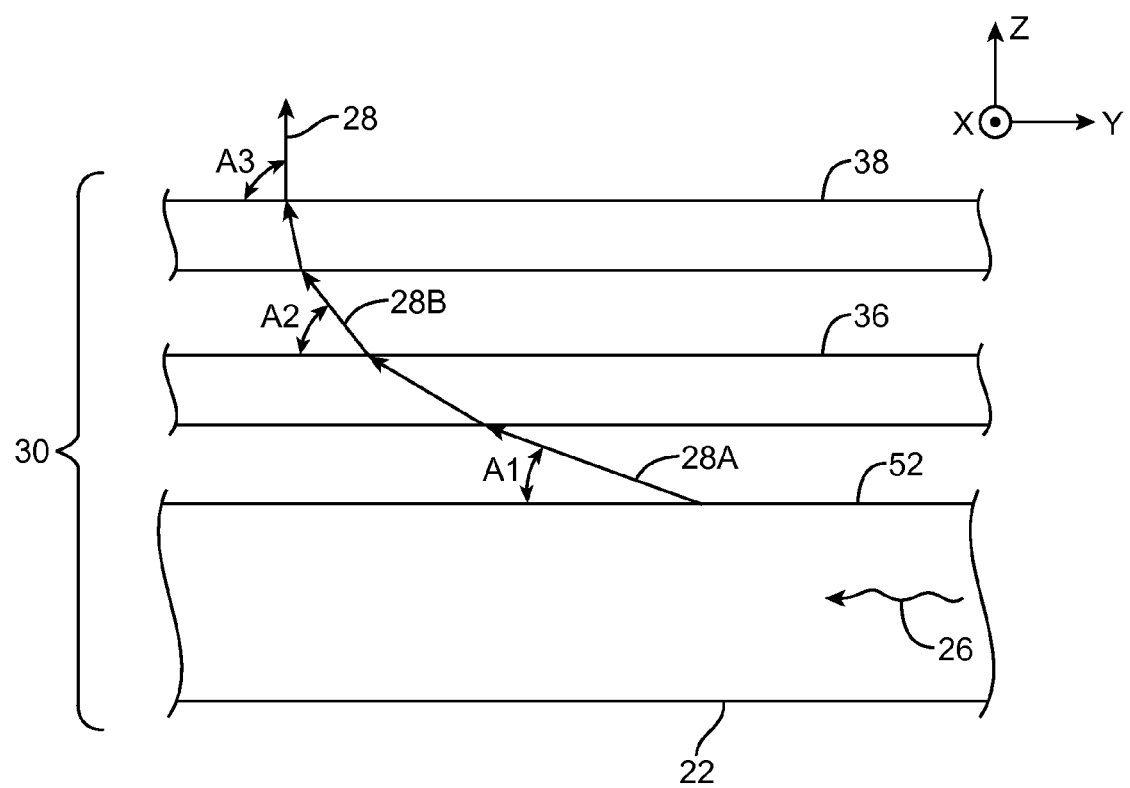
FIG. 3 is a cross-sectional side view of a portion of a backlight unit showing how backlight may be directed upwards using multiple layers of brightness enhancing film structures in accordance with an embodiment of the present invention.

FIG. 3 is a cross-sectional side view of a portion of backlight structures 30. Light guide plate 22 may be a planar member with opposing upper and lower surfaces. As shown in FIG. 3, light 26 that is propagating in light guide plate 22 may scatter out of upper surface 52. A pattern of pits and/or bumps may be provided on the upper and/or lower surface of light guide plate 22 to enhance light scattering.

Light 26 typically scatters out of upper surface 52 at a relatively low angle A1 with respect to the plane of upper surface 52 (i.e., the X-Y plane of FIG. 3).

Brightness enhancing films such as films 36 and 38 may be used to collimate the backlight produced by structures 30. In the example of FIG. 3, backlight structures 30 include a lower brightness enhancing film such as film 36 and an upper brightness enhancing film such as film 38. If desired, fewer or more layers of brightness enhancing film may be used. The example of FIG. 3 is merely illustrative.

Scattered light rays 28A that exit surface 52 of light guide plate 22 may be characterized by a relatively low angle of A1 with respect to surface 52 (e.g., A1 may be less than 45°). If left uncorrected, the low angle of rays 28A will render rays 28A ineffective for backlighting display module 32. Accordingly, brightness enhancing films 36 and 38 may be used to direct light 28A upwards towards the user. In particular, brightness enhancing film 36 may direct light rays 28A upwards at a steeper angle such as angle A2 and brightness enhancing film 38 may direct light rays 28B upwards at an even steeper angle such as angle A3. Angle A2 may lie between 30° and 90° (as an example). Angle A3 may be close to 90° (i.e., light 28, which is produced by passing light 28B through upper brightness enhancing film 38, may propagate parallel to vertical dimension Z, with a relatively modest angular spread to provide illumination for off-axis viewing). Collimating light from light guide plate 22 in this way ensures that backlight 28 will serve as suitable illumination for display layers such as display module 32.

Figure 4:
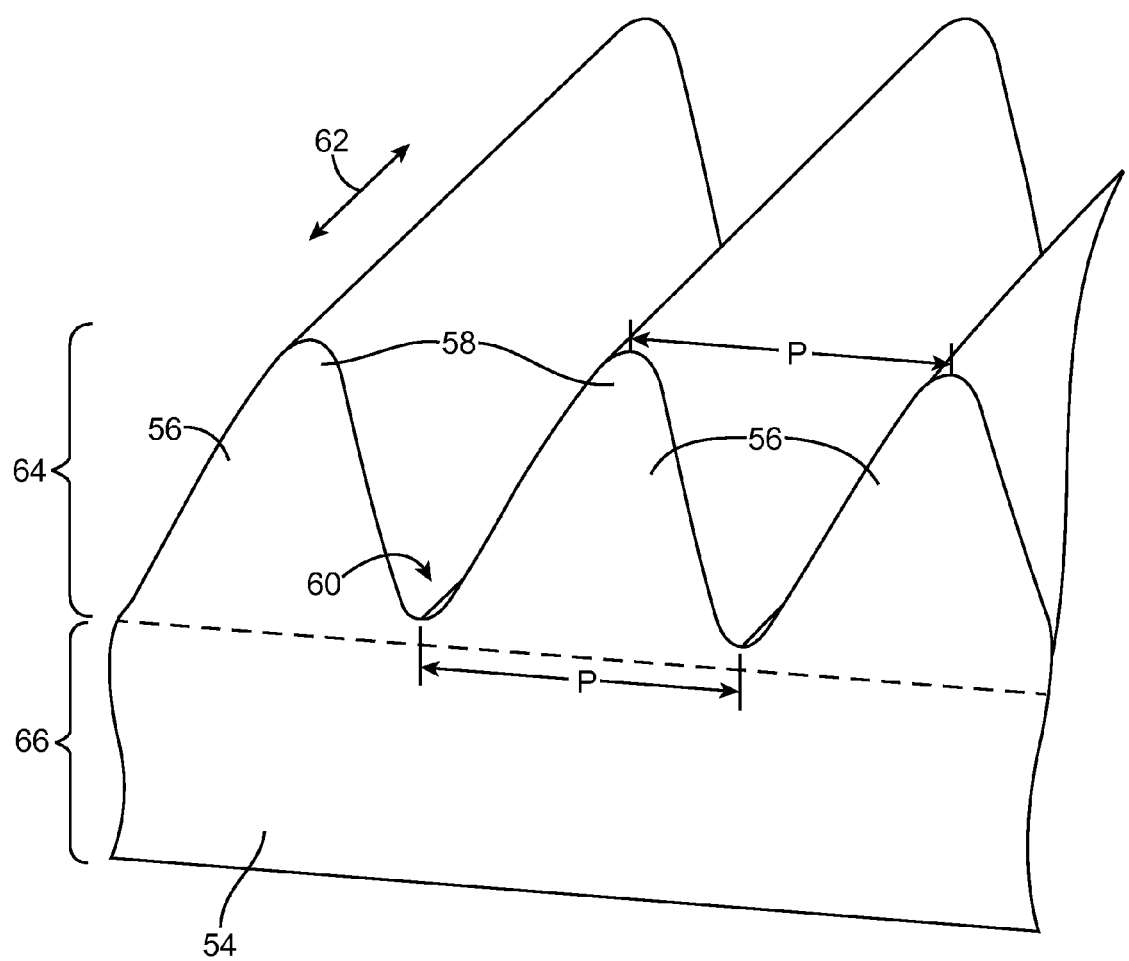
FIG. 4 is a perspective view of a portion of an illustrative brightness enhancing film in accordance with an embodiment of the present invention.

A perspective view of a portion of the surface of a brightness enhancing film structure of the type that may be used in implementing layers 36 and 38 is shown in FIG. 4. As shown in FIG. 4, brightness enhancing film 54 (i.e., a transparent film of the type that may be used to implement layer 36 and/or layer 38) may have a series elongated protrusions such as ridges 56 that run parallel to each other. Each ridge 56 may have a triangular cross-section or other suitable cross-sectional shape. Ridges 56 may run parallel to ridge axis 62. Each ridge may be characterized by a peak portion 58. Adjacent ridges may be separated by interposed troughs 60. Peaks 58 may be separated from each other by a pitch P of about 24 microns (e.g., a pitch from 5-50 microns or other suitable pitch size). Troughs 60 may likewise be separated from each other by a pitch P of about 24 microns (e.g., a pitch from 5-50 microns or other lateral separation).

Peaks 58 and troughs 60 may have elongated shapes that extend along axis 62. In an assembled backlight unit, one brightness enhancement film (e.g., film 36) may have a ridge axis such as axis 62 that is oriented at one angle with respect to light 26 exiting light source 24 and another brightness enhancing film (e.g., film 38) may have a ridge axis such as axis that is oriented at another angle with respect to light 26 exiting light source 24. Using different orientation angles for the ridge axis of each film may help reduce undesired Moiré effects that might otherwise result from aligning the ridges of films 36 and 38 in parallel with each other.

In the example of FIG. 4, ridges 58 have a triangular cross section with rounded peaks. This is merely illustrative. For example, ridges 58 may be configured to form sinusoidal corrugations or a series of parallel elongated protrusions with other cross-sectional shapes.

Brightness enhancing film 54 may be formed by embossing or otherwise processing a polymer film layer or may be formed by patterning a liquid polymer (e.g., a ultraviolet-light-cured resin) on a solid polymer substrate (e.g., a polyester film such as polyethylene terephthalate film). As an example, portion 66 of brightness enhancing film 54 may be formed from a solid polymer substrate layer such as a flexible sheet of polyethylene terephthalate and portion 64 of brightness enhancing film 64 may be formed from ultraviolet-light-cured resin.

Figure 5:
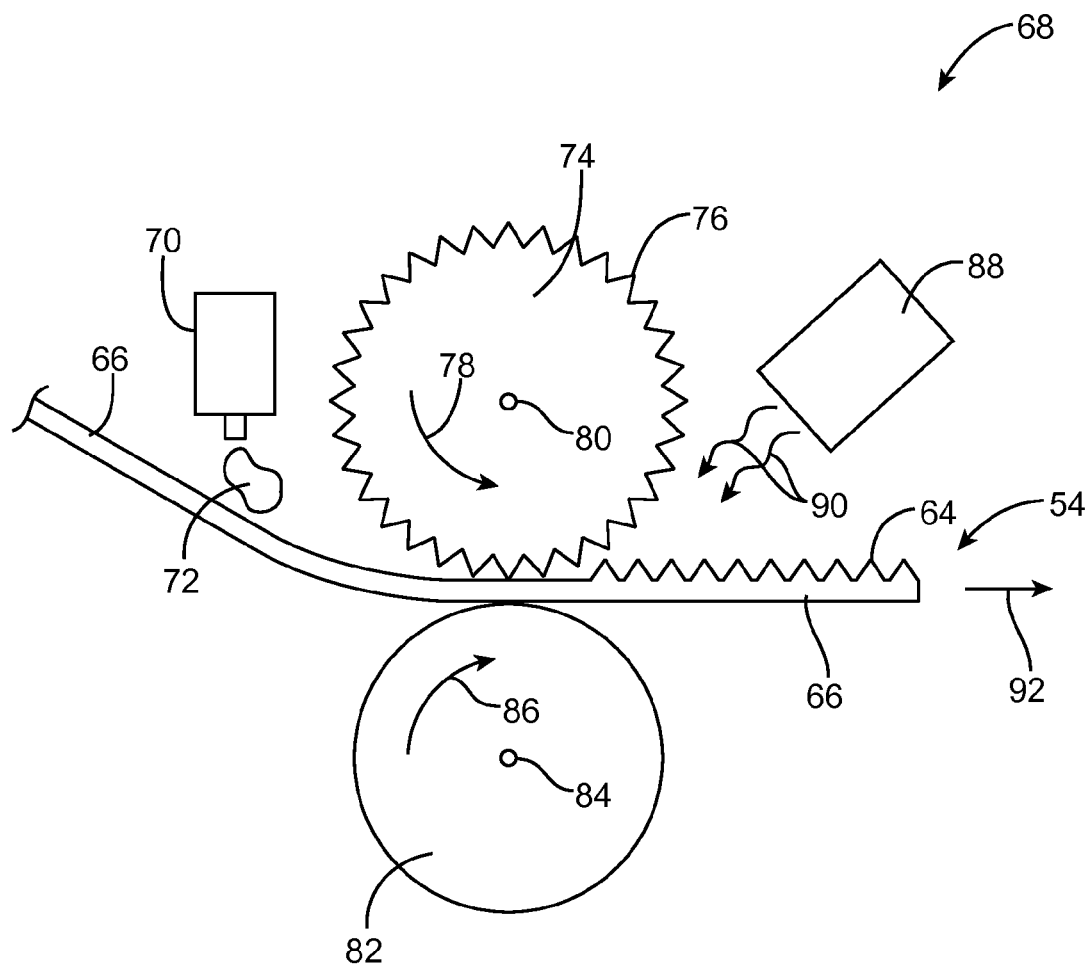
FIG. 5 is a side view of equipment of the type that may be used in forming brightness enhancing films in accordance with an embodiment of the present invention.

FIG. 5 is a cross-sectional side view of a system of the type that may be used in forming brightness enhancing film 54 of FIG. 4. As shown in FIG. 5, system 68 may include rollers such as roller 74 and roller 82. Roller 74 may rotate in direction 78 about rotational axis 80. Roller 82 may rotated in direction 86 about rotational axis 84. Resin dispensing tool 70 may dispense uncured liquid resin (e.g., liquid ultraviolet-light-curable polymer resin) on the surface of flexible polymer substrate 66. Roller 74 may have a patterned surface with protruding features 76. As layer 66 is passed through rollers 74 and 82 in direction 92, resin 72 may be patterned by features 76. Light 90 (e.g., ultraviolet light) from light source 88 may cure resin 72 on the surface of layer 66, thereby forming patterned ridge structures 64.

Figure 6:
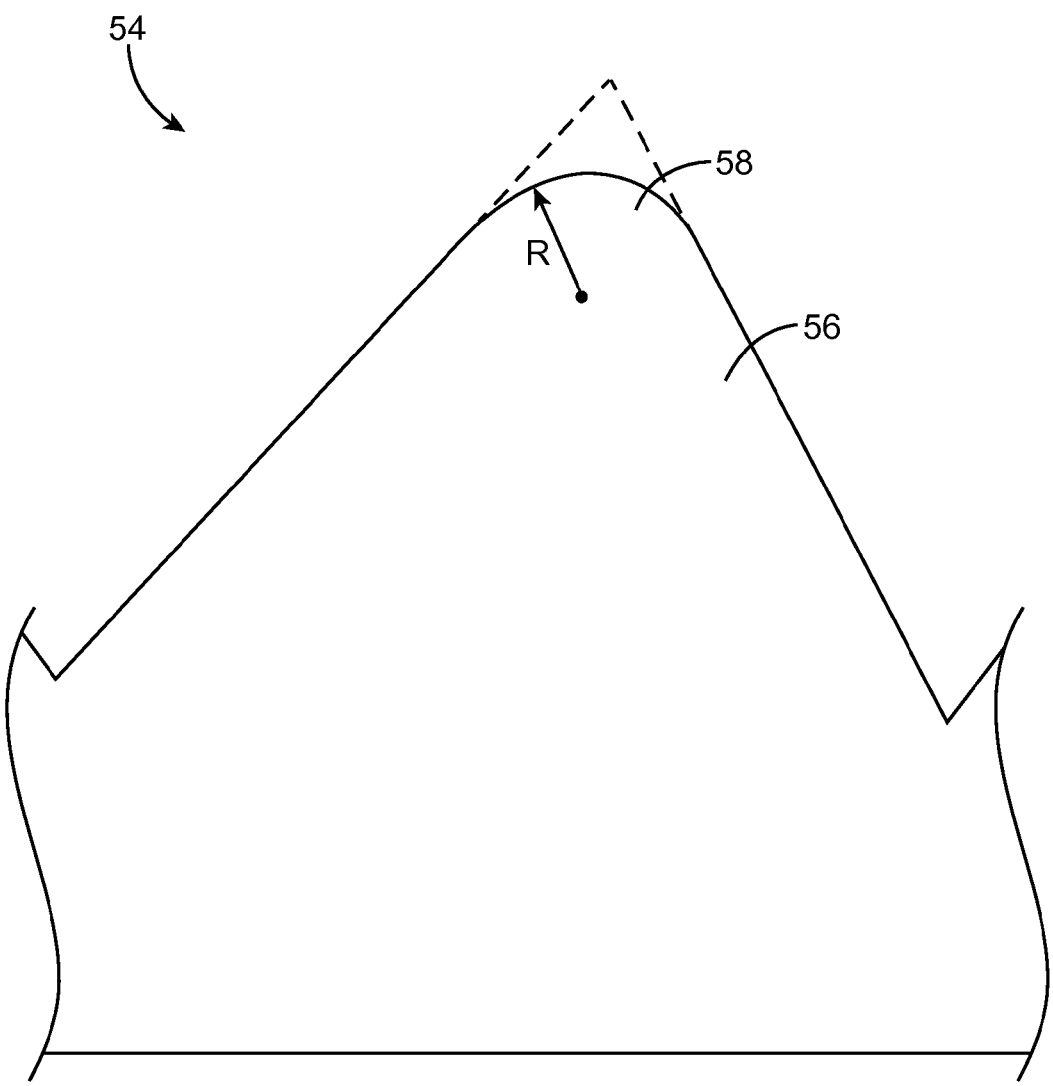
FIG. 6 is a side view of a portion of a triangular ridge with a rounded tip of the type that may be used to provide a brightness enhancing film with increased mechanical robustness in accordance with an embodiment of the present invention.

As shown in the cross-sectional diagram of FIG. 6, peaks (tips) 58 of ridges 56 may have a rounded shape. This may help make brightness enhancement film 54 robust and resistant to damage during an impact event that generates force on the surface of display 14.

Conventional brightness enhancing films may have ridges with triangular cross sections and tips that are sharp (i.e., a tip shape characterized by a radius of curvature of about 0.5 microns or less). This makes the tips of conventional brightness enhancing films vulnerable to being crushed when display 14 is struck by an external object. Crushed portions of a conventional film may give rise to uneven backlighting and undesirable white or dark patches on a display.

In contrast, ridges 56 may have a rounded shape with a radius of curvature R of greater than 0.5 microns, and preferably greater than 1 micron, greater than 2 microns, 2-4 microns, 1-5 microns, greater than 3 microns, or greater than 4 microns. By providing peaks 58 of triangular ridges 56 or other suitable ridges 56 with sufficiently rounded shapes, the susceptibility of ridges 56 to damage during impact events on display 14 may be significantly reduced. For example, resistance to damage in a ball drop test may be enhanced by a factor of two or three in comparison to conventional sharp-tipped films. The use of rounded peaks 58 for ridges 56 may therefore make display 14 less vulnerable to damage during use of device 10 by a user.

The foregoing is merely illustrative of the principles of this invention and various modifications can be made by those skilled in the art without departing from the scope and spirit of the invention. The foregoing embodiments may be implemented individually or in any combination.

What is claimed is:

1. A plurality of brightness enhancing films, comprising: a first brightness enhancing film that includes a first transparent layer having a series of parallel ridges, each ridge having a triangular cross section with a rounded peak that has a radius of curvature of at least one micron; and a second brightness enhancing film that includes a second transparent layer having a series of parallel ridges, each ridge having a triangular cross section with a rounded peak that has a radius of curvature of at least one micron, wherein the ridges of the first transparent layer extend parallel to a first axis, and wherein the ridges of the second transparent layer extend parallel to a second axis.

2. The plurality of brightness enhancing films defined in claim 1 wherein each ridge is configured to exhibit a rounded peak with a radius of curvature of at least two microns.

3. The plurality of brightness enhancing films defined in claim 2 wherein the first transparent layer of material comprises a patterned layer of material on a flexible substrate.

4. The plurality of brightness enhancing films defined in claim 3 wherein the patterned layer of material comprises a patterned ultraviolet-light-curable resin.

5. The plurality of brightness enhancing films defined in claim 4 wherein the flexible substrate comprises a transparent sheet of polymer.

6. The plurality of brightness enhancing films defined in claim 5 wherein the transparent sheet of polymer comprises a polyester layer.

7. The plurality of brightness enhancing films defined in claim 1 wherein the rounded peak of each ridge has a radius of curvature of at least three microns.

8. A display, comprising: display layers configured to generate an image; and a backlight unit configured to provide backlight for the display layers, the backlight unit including a plurality of brightness enhancing films, wherein the plurality of brightness enhancing films comprises: a first brightness enhancing film that includes a first transparent layer having a series of parallel ridges, each ridge having a rounded peak that has a radius of curvature of at least one micron, and a second brightness enhancing film that includes a second transparent layer having a series of parallel ridges, each ridge having a rounded peak that has a radius of curvature of at least one micron, wherein the ridges of the first transparent layer extend parallel to a first axis, and wherein the ridges of the second transparent layer extend parallel to a second axis.

9. The display defined in claim 8 wherein the ridges have triangular cross-sectional shapes.

10. The display defined in claim 9 wherein the backlight unit comprises: a light guide plate; and a light source configured to emit light into an edge of the light guide plate, wherein the plurality of brightness enhancing films overlaps the light guide plate and is configured to collimate light scattered from the light guide plate.

11. The display defined in claim 10 wherein the display layers comprise a thin-film transistor layer and a color filter layer.

12. The display defined in claim 8 wherein the first brightness enhancing film comprises a patterned layer of material on a transparent flexible substrate.

13. The display defined in claim 12 wherein the patterned layer of material comprises a layer of cured ultraviolet-light-curable resin.

14. The display defined in claim 13 wherein the transparent flexible substrate comprises polyester.

15. The display defined in claim 14 wherein the display layers comprise:
 a color filter layer; and
 a thin-film transistor layer.

* * * * *